Figure 1:
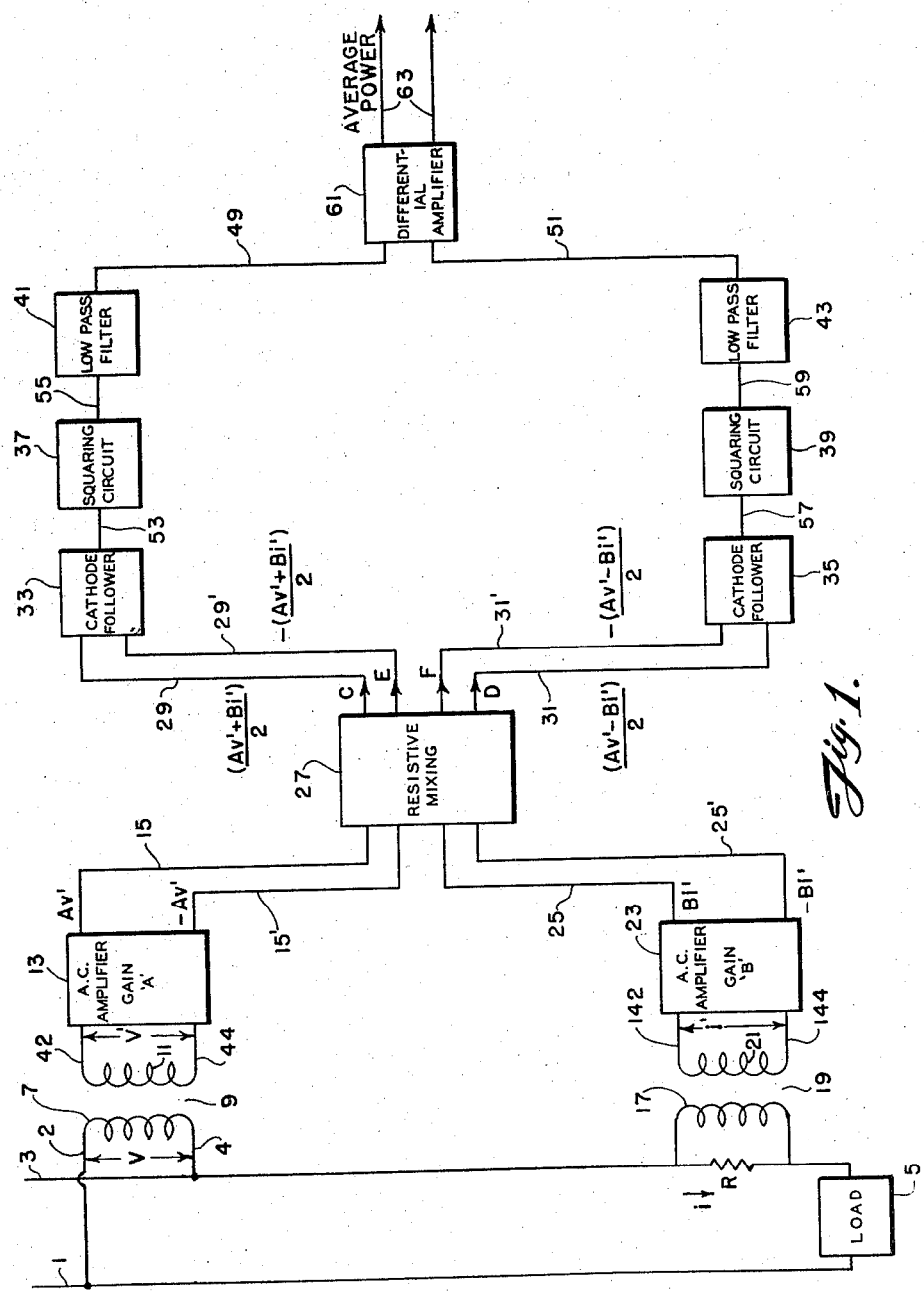

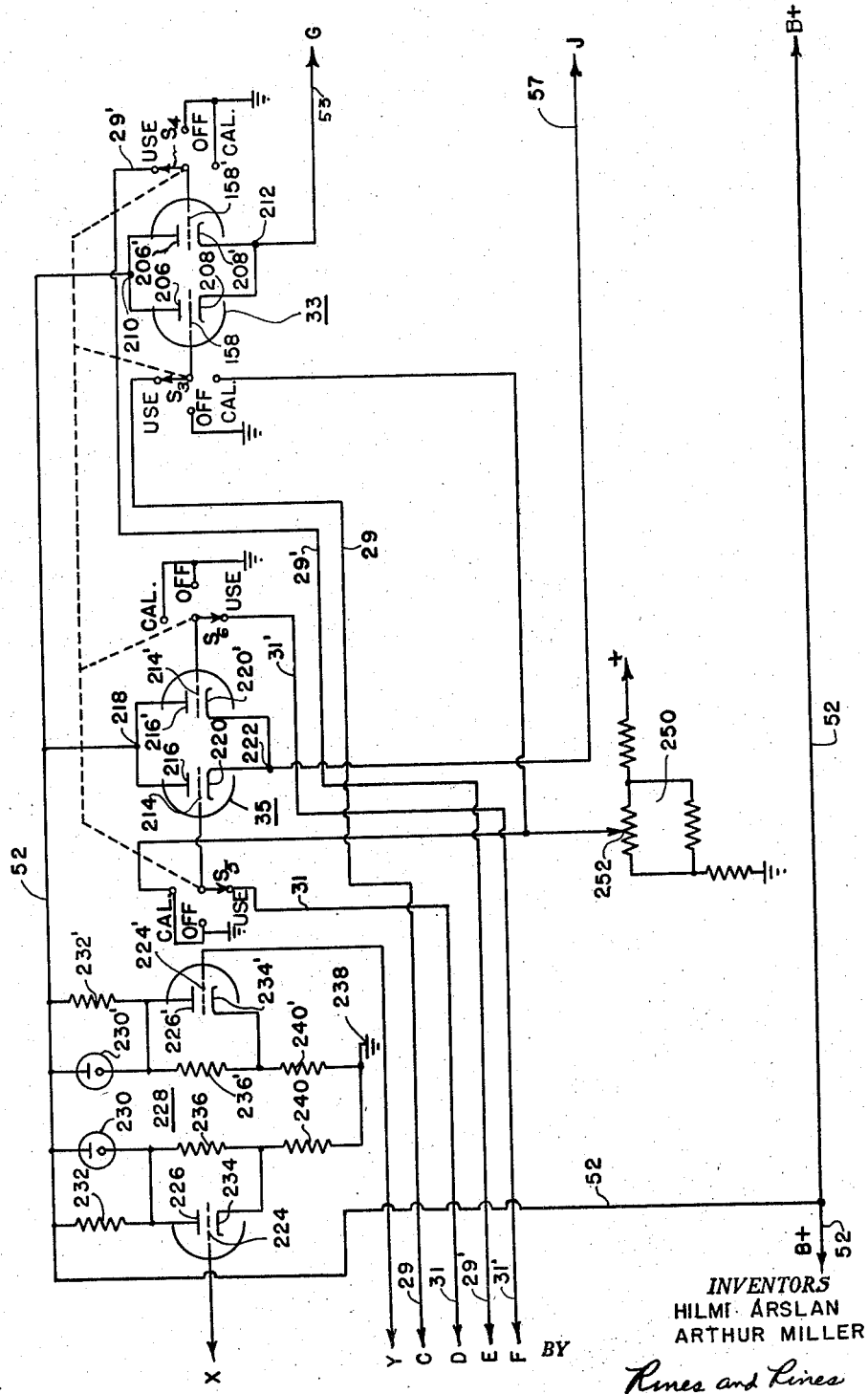

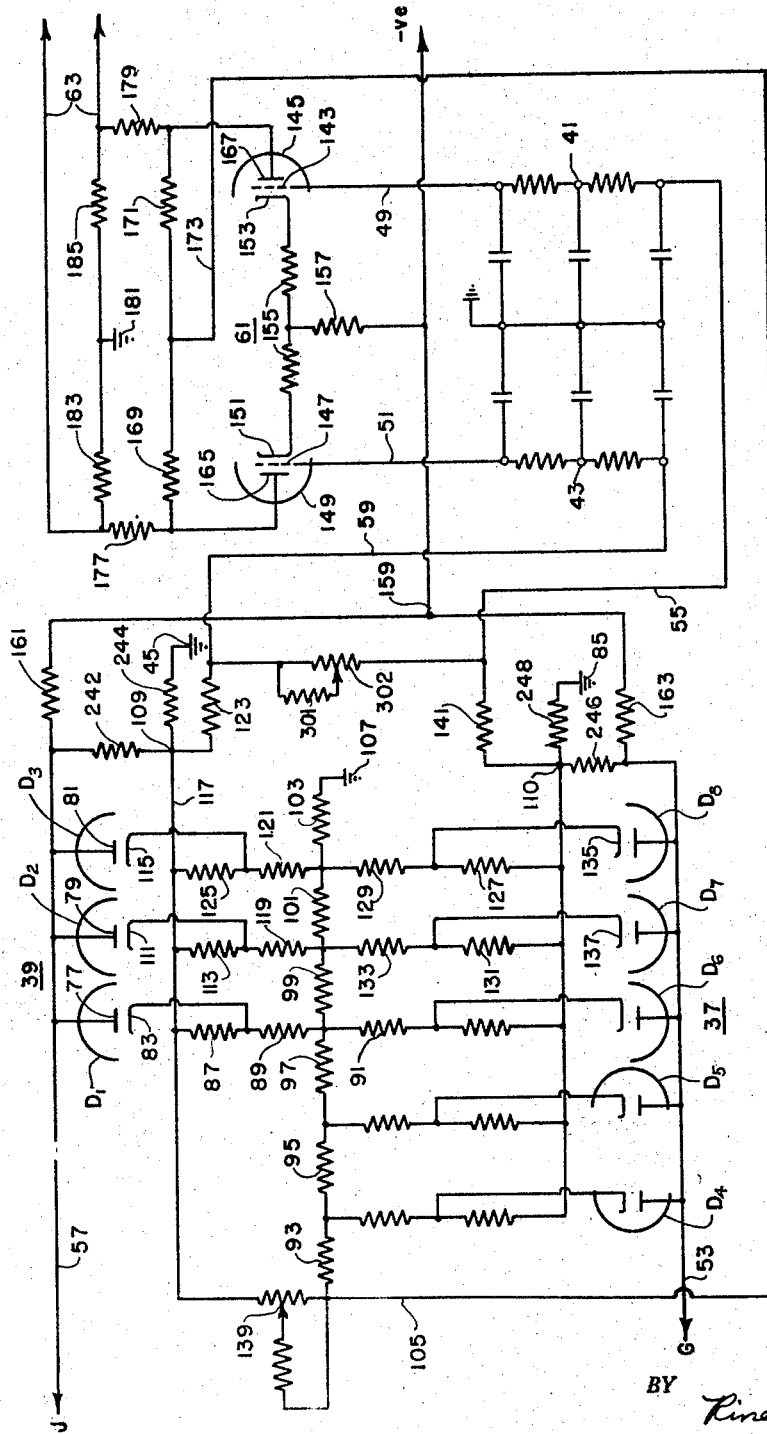

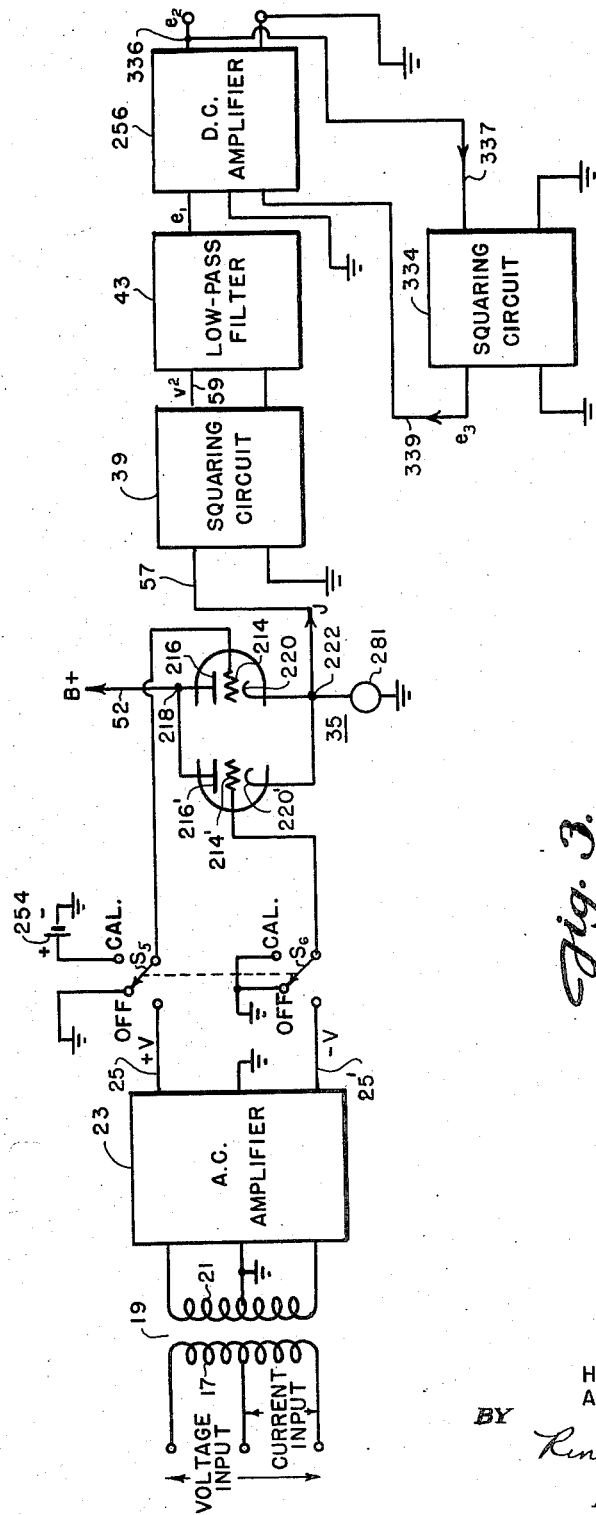

INVENTORS
HILMI ARSLAN
ARTHUR MILLER
BY Rines and Rines
ATTORNEYS

United States Patent Office 2,879,477
Patented Mar. 24, 1959

2,879,477

ELECTRIC METER

Arthur Miller, Brookline, and Hilmi Arslan, Waban, Mass., assignors to Sanborn Company, Cambridge, Mass., a corporation of Massachusetts Application January 3, 1956, Serial No. 556,962

12 Claims. (Cl. 324—142)

The present invention relates to electric meters and, more particularly, to electronic circuits adapted to measure alternating-current power and alternating currents and voltages.

Referring, first, to the measurement of alternating-current power, conventional wattmeters of the dynamometer type employ electromagnetic coils to indicate average power fed to a load as a function of the torque exerted by the electromagnetic field of the coils upon a needle. The needle deflection, however, is usually not exactly proportional to the average power. In addition, the watt-meter movement consumes appreciable power, it is relatively sluggish in response, and it is not easily combined with direct-writing recording channels, such as direct-writing oscillographic recorders. Similar considerations apply to the measurement and recording of the root-mean-square (R.M.S.) value of alternating currents and voltages. Such devices, moreover, are accurate only over a relatively narrow frequency range.

Some of the above disadvantages may be obviated, however, if the average value of the power or the R.M.S. value of the alternating currents or voltages is converted into a corresponding direct-current voltage. The converter should be capable of operating over a broad frequency range and with a low power drain from the circuit being measured. The converted direct-current voltage may then be indicated or recorded by direct-current indicating and recording instruments, such as the before-mentioned oscillographic recorders.

In an alternating-current circuit, the product $vi$ of the instantaneous voltage $v$ and the current $i$ constitutes the instantaneous power. The instantaneous power, however, varies cyclically at twice the frequency of the alternating-current energy. It is the average value of the instantaneous power over several cycles that is usually of interest for purposes of power measurement. In the case of sinusoidally varying alternating-current energy, for example, the instantaneous power $vi$ may be expressed by the equation:

$$vi = \frac{VI}{2} \cos \theta - \frac{VI}{2} \cos (2\omega t + \theta)$$

where $V$ and $I$ are respectively the peak values of the voltage and current, $\cos \theta$ is the power factor, $\omega$ is the angular frequency of the alternating-current energy, and $t$ is time. The average value of the power is the first term of the above equation, namely, the direct-current component, $$\frac{VI}{2} \cos \theta$$

By filtering out the second or alternating-current term, as with a low-pass filter, therefore, the desired average value of the power $vi$ may be obtained.

In order to obtain the product $vi$, it is, of course, necessary to multiply a voltage representative of the current by a voltage representative of the voltage in the alternating-current circuit. This may be achieved with satisfactory accuracy and simplicity by producing signal voltages $v'$ and $i'$ proportional, respectively, to, for example, the line voltage $v$ and the line current $i$ of the alternating-current circuit. The sum of the voltages $v'+i'$ is fed to a squaring system, as is the difference of the voltages $v'-i'$. The outputs of the squaring systems are accordingly, respectively proportional to $(v'+i')^2$ and $(v'-i')^2$. These voltages may be substracted from one another, thereby obtaining a voltage proportional to the product $v'i'$, and the alternating-current component thereof may be filtered out to obtain the average power.

While different types of squaring circuits have heretofore been proposed, employing the substantially square-law characteristics or responses of vacuum tubes or diodes and the like, such circuits are not considered of sufficient stability for the purposes of the present invention in view of their dependence upon the stability, accuracy and reproducibility of the tube characteristics. It is deemed preferable, accordingly, to utilize a network employing a plurality of differently biased thermionic or other diodes to produce successive segmented straight-line approximations to a square-law characteristic. Such a network depends not upon the volt-ampere characteristic response of the diodes, but, rather, upon the more reliable on-off or conducting-non-conducting switching operation of the diodes, as later more fully explained. Other types of switching devices may also be employed. Since diodes are inherently unidirectional devices, and it is this very property which makes them applicable to this type of squaring circuit, however, it is seen that a squaring circuit made up of a single group of diodes would be operative for only the half cycle of the alternating-current signal which is of the proper polarity to render the diodes conducting. During the other half cycle, the opposite polarity of this alternating-current signal would produce no output at all. If the alternating-current waveform were itself symmetrical about the zero voltage axis, then the "half time" operation of the squaring circuit would yield results which were accurately proportional to the total average power, but if the alternating-current wave form were asymmetrical, then erroneous results would be obtained.

An object of the present invention, therefore, is to provide a new and improved electric wattmeter utilizing squaring circuits of the above-mentioned type that shall not be subject, however, to the above-described disadvantages, but that, to the contrary, shall be of equal utility both with sinusoidal alternating-current waves and alternating-current waves of other wave shapes, including unsymmetrical wave forms.

From a broader point of view, indeed, the present invention relates to a new and improved electric analog computer.

A further object is to provide a new and improved electronic meter that may be utilized to provide direct-current voltages proportional to the average value of the power in a given alternating-current system and suitable for use with direct-current recording equipment.

An additional object is to provide a new and improved meter that may produce a direct-current voltage proportional to the R.M.S. value of the voltage or current in an alternating-current system.

Other and further objects will be explained hereinafter and will be more particularly pointed out in the appended claims.

Figure 2:
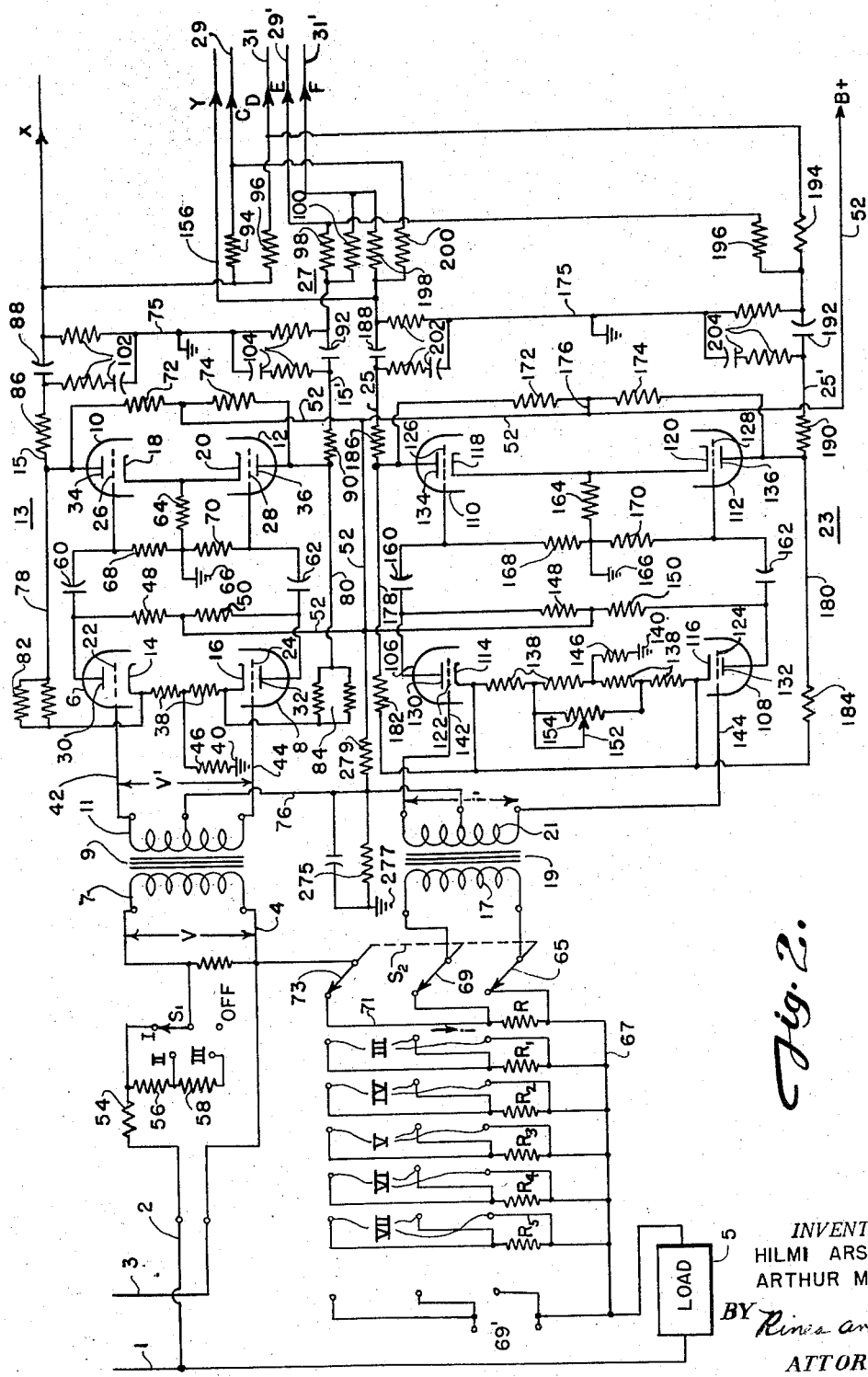
Figure 4:
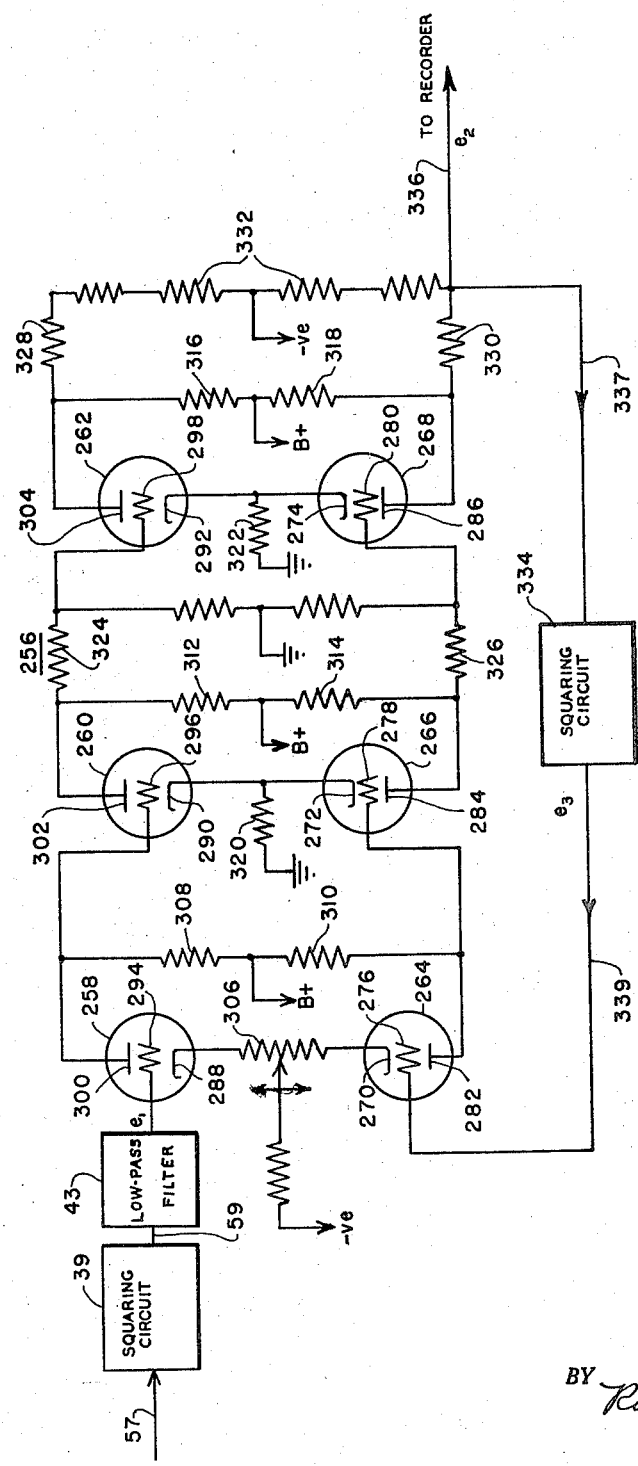

The invention will now be described in connection with the accompanying drawings, Fig. 1 of which is a block diagram of a wattmeter circuit embodying the present invention;

Figs. 2, 2A and 2B are schematic circuit diagrams of successive portions of an electrical wattmeter circuit embodying the invention in preferred form; and Figs. 3 and 4 are circuit diagrams illustrating the application of some of the features of the present invention to an R.M.S. voltmeter or ammeter.

Referring to Fig. 1, a source of alternating-current energy, of any desired wave shape, is shown applied by conductors 1 and 3, such as mains conductors, to a load 5. In accordance with this embodiment of the present invention, a direct-current voltage is produced proportional to the average value of the power delivered by the conductors 1 and 3 of the load 5. The voltage $v$ between the conductors 1 and 3, is fed by conductors 2 and 4 to the primary winding 7 of a voltage transformer 9. There will appear in the secondary winding 11 of the transformer 9, a voltage $v'$ proportional to the line voltage $v$ and fed to the input conductors 42 and 44 of a first alternating-current push-pull amplifier 13. This amplifier may, for example, have any arbitrary gain of value A. Inserted between the conductor 3 and the load 5 is a small resistor R through which the alternating current fed to the load 5 may pass. The primary winding 17 of a current transformer 19 is connected in parallel with the resistor R so that there may be fed to the secondary winding 21 of the current transformer 19 a voltage $i'$ proportional to the current flowing in the load 5. The secondary winding 21 is shown connected to the input conductors 142, 144 of a further alternating-current push-pull amplifier 23 which may have any arbitrary gain of value B. There will be produced in the outputs of the amplifiers 13 and 23 voltages proportional to the respective input voltages $v'$ and $i'$. At one of the output conductors 15, for example, of the push-pull amplifier 13, there will appear a voltage of value equal to the input voltage $v'$ multiplied by the gain A of the amplifier, namely, $Av'$. There will appear at the other output conductor 15', an out-of-phase voltage equal to $-Av'$. Similarly, at the output conductors 25 and 25' of the push-pull amplifier 23, voltages equal to $Bi'$ and $-Bi'$, respectively, are produced.

The voltages $Av'$, $-Av'$, $Bi'$ and $-Bi'$ are all fed to a resistive mixing device 27 having four output terminals C, E, D and F associated with respective output conductors 29, 29', 31 and 31'. At the output terminals C and E, there will appear voltages corresponding respectively to the quantities $$\frac{(Av'+Bi')}{2}$$

and $$\frac{-(Av'+Bi')}{2}$$

There will similarly result at the output conductors 31 and 31', the respective voltages $$\frac{(Av'-Bi')}{2}$$

and $$\frac{-(Av'-Bi')}{2}$$

The voltages fed along the conductors 29 and 29' are applied to a cathode follower 33 and the voltages fed along the conductors 31 and 31' are applied to a similar cathode follower 35. The cathode followers 33 and 35 feed similar squaring circuits 37 and 39, respectively, by way of conductors 53 and 57. The voltages in the output conductors 55 and 59 of the respective squaring circuits 37 and 39 will respectively correspond substantially to $$\frac{(Av'+Bi')^2}{4}$$

and $$\frac{(Av'-Bi')^2}{4}$$

The outputs of the squaring circuits 37 and 39 are fed by respective output conductors 55 and 59 through respective low-pass filters 41 and 43 of any desired type. The outputs of the low-pass filters 41 and 43 are fed by the respective conductors 49 and 51 to a differential amplifier 61. There will be produced in the output conductors 63 of the differential amplifier 61 a voltage proportional to the average value of the power fed by the alternating-current lines 1 and 3 to the load 5. As a result of the alternating-current filtering action of the filters 41 and 43, the direct-current component or average value only of this voltage is present in conductors 63. This filtering could, if desired, follow, instead of precede, the amplifier 61. The conductors 63 may, therefore, be directly applied to a direct-current indicating or recording instrument, such as the previously mentioned oscillographic recorders.

It is now in order to describe a preferred circuit diagram of a wattmeter constructed in accordance with the present invention that has been found, in practice, to operate very satisfactorily. Referring to Figs. 2, 2A and 2B, the source of alternating-current energy, such as the mains 1, 3, is shown connected by conductor 2, a resistor 54 and a switch $S_1$ to the upper terminal of the primary winding 7 of the voltage transformer 9, and by a conductor 4 to the lower terminal of the primary winding 7. The secondary winding 11 is shown connected to the input conductors 42, 44 of an alternating-current amplifier 13 which comprises a pair of push-pull-operated electron-tube stages 6, 8 and 10, 12. Each of the electron tubes or tube sections 6, 8, 10 and 12 is shown preferably comprising three electrodes, namely, respective cathodes 14, 16, 18 and 20, respective control-grid electrodes 22, 24, 26 and 28, and respective plates or anodes 30, 32, 34 and 36. The cathodes 14 and 16 of the electron tubes or tube sections 6 and 8 are shown connected together through similar cathode resistors 38 and to a grounded terminal 40 through a common cathode resistor 46. The control-grid electrodes 22 and 24 are respectively connected by the input conductors 42 and 44 to the upper and lower terminals of the secondary winding 11 of the voltage transformer 9, being thus fed in push-pull relation. The magnitude of the input voltage $v$ to the primary winding 7 of the voltage transformer 9 may be controlled through the operation of the switch $S_1$ to positions I, II and III, placing in the connection 2 from the mains 1, successive voltage-dropping resistors 54, 56 and 58. As an illustration, the voltage range may be 25, 125 and 250 volts with the switch $S_1$ in its respective three positions. The output voltage from the stages 6 and 8 may be fed from the respective plates 30 and 32 by way of respective coupling condensers 60 and 62 to the respective control electrodes 26 and 28 of the second pair of push-pull amplifiers 10, 12. The cathodes 18 and 20 of the amplifiers 10, 12 are shown connected together through a common resistor 64 to the ground terminal 66. Grid-to-cathode resistors 68 and 70 are connected between the respective control electrodes 26 and 28 of the respective amplifiers 10 and 12 and the terminal 66. The plates or anodes 30 and 32 of the first pair of push-pull amplifiers 6, 8, and the plates or anodes 34 and 36 of the second pair of push-pull amplifiers 10, 12, are shown connected through respective plate loads 48, 50, 72 and 74 to conductors 52 that are, in turn, connected to the B+ terminal of the plate supply voltage source. A voltage divider across the B+ supply from the conductor 52 to the ground connection 277, comprising resistors 275 and 279, provides the proper direct-current operating voltage for the control grid circuits of the first stage triodes of both the voltage and current amplifiers 13 and 23.

The operation and gain of the amplifier stages 13 comprising the two pairs of push-pull amplifiers 6, 8 and 10, 12 is stabilized through the expedient of voltage feedback applied from the plates 34, 36 of the second pair of amplifiers 10, 12 by respective conductors 78 and 80, through respective resistor networks 82 and 84, to the respective cathodes 14 and 16 of the first pair of amplifiers 6 and 8. There is thus available at the plate 34 of the amplifier 10 the voltage Av' which may be fed to the terminal X, at the far right in Fig. 2, by the conductor 15, the output resistor 86 and the coupling condenser 88. The voltage $$\frac{Av'}{2}$$

is also available at the terminals C and D which are respectively connected through resistors 94 and 96 to the terminal X. The voltage —Av' at the output conductor 15' of the amplifier 12, on the other hand, is fed to the terminal E through the output resistor 90, the coupling condenser 92 and the further resistor 98 and appears at terminal E as $$\frac{-Av'}{2}$$

A resistor 100, also connected to the output coupling condenser 92, provides for the presence at the terminal F of the same voltage $$\frac{-Av'}{2}$$

Shunting the output coupling condensers 88 and 92 of the respective amplifiers 10, 12 are respective series-connected resistor-capacitor equalizing networks 102 and 104, interconnected by the conductor 75.

Turning, now, to the current transformer 19 and its associated alternating-current amplifier 23, the primary winding 17 of the current transformer 19 is energized when the three-pole switch $S_2$, having ganged switch members 65, 69 and 73, is in the illustrated position. Connections are then established, first, from the bottom terminal of the primary winding 17 through the lowermost switch member 65 and a conductor 67 connected to the right-hand terminal of the load 5, and, secondly, from the upper terminal of the primary winding 17 through the intermediate switch member 69 and by way of conductor 71 and the uppermost switch member 73 to the mains conductor 3. The transformer primary winding 17 is thus connected in series with the mains conductor 3 and the right-hand terminal of the load 5, as in Fig. 1, with a resistor R shunted thereacross. As in the case of the resistors 54, 56 and 58 and switch terminals I, II and III of the switch $S_1$, before discussed in connection with the adjustment of the voltage v fed to the primary winding 7 of the voltage transformer 9, the voltage delivered to the primary of the current transformer 19 is made proportional to any desired fraction of the load current. As an illustration, if we assume that the in-phase voltage required at this primary for full scale deflection of the recorder is 100 millivolts, and that the load current for the first range of the instrument is to be 40 milliamperes, then the value of R would be 2.5 ohms. For successively larger load currents, the values of the shunt resistors $R_1$, $R_2$, $R_3$, $R_4$, $R_5$ become successively smaller, reaching a value of .05 ohm for $R_5$, and providing a current range of 2 amperes for the instrument. The current transformer 19, moreover, is so designed that its primary winding 17 presents a very high impedance across even the highest value of shunt resistance which may be employed in this circuit and thus has substantially no effect upon the voltage drop across these shunt resistors $R_1$ through $R_5$. For load currents which are too great to be handled by the shunt resistors provided internally in the instrument, terminals 69' are provided for use with a heavy shunt or suitable current transformer, either of which may be connected in series with the load externally. The center tap of the current transformer secondary winding 21 is connected to the center tap of the voltage transformer secondary winding 11 by conductor 76, and through the bias network 275 to the ground terminal 277.

The secondary winding 21 of the current transformer 19 is shown connected to the input conductors 142 and 144 of a pair of push-pull amplifier stages 106, 108 corresponding to the push-pull amplifier stages 6, 8 of the amplifier 13 and constituting the first stage of the push-pull amplifier 23. The outputs of the push-pull connected amplifiers 106, 108 are fed to the inputs of a second pair of push-pull-connected amplifiers 110, 112, corresponding to the second pair of amplifiers 10, 12 of the amplifier 13. Elements in the circuits of the push-pull amplifier 23 that correspond to the similar elements of the push-pull amplifier 13 have been given the same numerals, except augmented by 100. It is therefore not necessary to describe further the circuit connections and functioning of the amplifier 23, other than to point out that the gain B of the amplifier 23 may be adjusted to be compatible with the gain of the voltage amplifier. This is effected through movement of the potentiometer slider 152 upon the potentiometer winding 154 that is connected between intermediate points of the cathode resistor 138 of the tubes 106 and 108, thereby varying the degenerative feedback and hence the gain of the amplifier.

There will thus be available at the output conductors 25 and 25' at the respective plates 134 and 136 of the second pair of push-pull amplifier stages 110 and 112 of the amplifier 23, voltages corresponding to Bi' and minus Bi'. These voltages are fed to the right through respective coupling resistors 186, 190 and respective coupling condensers 188 and 192. The voltage Bi' will also be available at the terminal Y, at the right-hand side of Fig. 2, through the connection of the conductor 156, associated with the terminal Y, to the output coupling condenser 188. The voltage $$\frac{Bi'}{2}$$

will also be present at the terminals F and C as a result of the connection of condenser 188 through respective resistors 198 and 200 to the respective terminals F and C. Similarly, the voltage —Bi' appearing at the plate 136 of the amplifier tube 112 will be fed to terminal D through resistor 194 and to terminal E through resistor 196, at which terminals this voltage will appear as $$\frac{-Bi'}{2}$$

The resistors 94, 96, 98, 100, 198, 200, 194 and 196 constitute the respective mixing network 27. Other forms of resistive mixing networks may also be utilized. By making these resistors of substantially equal value, say of the order of 2,000,000 ohms, the respective voltages Av', —Av', Bi' and —Bi' will be halved by the time they reach the output terminals C, D, E and F. The following mixed or added voltages will be obtained: at the terminal C, a voltage corresponding to $$\frac{(Av'+Bi')}{2}$$

at the terminal E, a voltage corresponding to $$\frac{-(Av'-Bi')}{2}$$

at the terminal D, a voltage corresponding to $$\frac{(Av'-Bi')}{2}$$

and at the terminal F, a voltage corresponding to $$\frac{-(Av'-Bi')}{2}$$

As described in connection with Fig. 1, the output conductors 29 and 29', respectively connected to the terminals C and E in the output of the resistive mixing network 27, are connected to the upper cathode follower 33. In Figs. 2 and 2A, the output terminals C and E are respectively connected by the conductors 29 and 29' to respective ganged switches $S_3$ and $S_4$ which, in turn, are connected to the control-grid electrodes 158 and 158' of a cathode follower 33 of the double-triode push-pull variety. The cathode follower plates 206, 206' are connected together at 210 and the cathodes 208 and 208' are inter-connected at 212. The B+ terminal, before-mentioned, supplies plate potential to the point of connection 210 by conductor 52. The point of connection 212 of the cathodes 208, 208' is connected to the right-hand terminal G of Fig. 2A. In similar fashion, the terminals D and F are connected by respective conductors 31 and 31' to respective ganged switches $S_5$ and $S_6$, and thence to the control-grid electrodes 214 and 214' of the other push-pull cathode follower 35, which, though shown below the cathode follower 33 in Fig. 1, is shown to the left of the cathode follower 33 in Fig. 2A. Like the cathode follower 33, the cathode follower 35 comprises, preferably, a double triode, the plates 216, 216' of which are connected together at 218 and to the B+ plate supply conductor 52. The cathodes 220 and 220' are similarly connected together at 222, and from the point 222 to the right-hand terminal J.

For proper operation of the squaring circuits, as discussed in detail subsequently, it is necessary that at any given instant, the output of a given cathode follower, say 33, shall be a voltage corresponding only to the signal on one of its input conductors 29 or 29'. By keeping the initial grid-cathode voltages of the cathode follower triodes close to cutoff, this purpose is accomplished as follows. Assuming that the voltage on conductor 29 is going in a positive direction, then the potential of cathode 208 will tend to follow it in the same direction. Cathode 208' is connected to 208, so that its potential will also rise in a positive direction. Grid 158', however, is connected to conductor 29', whose potential is now going in a negative direction. Thus the grid-cathode potential of the right-hand half of cathode follower 33 is being advanced into the cut-off region and this half of the double triode can contribute nothing to the output. Conversely, on the next half cycle of the alternating-current input signal, conditions are reversed and the cathode follower output now represents the potential on conductor 29', and the signal applied to conductor 29 is ignored. Thus the alternating-current input waveforms are reproduced in their entirety, but always in a positive direction, by the potential on conductor 53, in the case of the $$\frac{(Av'+Bi')}{2}$$

signal, and by the potential on conductor 57, in the case of the $$\frac{(Av'-Bi')}{2}$$

signal. The initial operating conditions for the cathode followers are determined by the bleeder current fed through resistors 244 and 248, Fig. 2B, by the resistor networks associated with the hereinafter-described diode squares, the resistors 242 and 246, the resistors 161 and 163, and the voltage $-ve$ applied at the junction 159 between resistors 161 and 163. These two resistors 161 and 163 and the voltage $-ve$ are proportioned to set the operation conditions of the cathode followers close to cut-off.

Before proceeding further to discuss the circuit details of the cathode followers 33 and 35, it is desired to invite attention to the fact that the terminals X and Y, having respective voltages corresponding to $Av'$ and $Bi'$, are connected in Fig. 2A to the respective control electrodes 224 and 224' of a further double triode 228. This double triode 228 serves in connection with neon or other indicator lamps 230 and 230', to indicate to the operator when the peak voltages or currents applied to the load 5 are outside the range of voltages with which the circuit of the present invention is designed accurately to operate as a wattmeter. If, for example, the wave form of the voltage or current is non-sinusoidal, or if the power factor is less than unity, it becomes possible for the latter-described squaring circuits to be driven beyond their normal ranges without producing an average power reading beyond the limits of the final indicating or recording instrument. The plates 226 and 226' of the double triode 228 are supplied with the B+ voltage through the plate loads 232 and 232' which are respectively shunted across the indicator lamps 230 and 230'. The plates 226 and 226' are also connected to their respective cathodes 234 and 234' through resistors 236 and 236', which, in conjunction with resistors 240 and 240', grounded at 238, serve to bias the cathodes with respect to the respective control-grid electrodes 224 and 224'. The cathodes 234 and 234' are grounded at 238 through cathode resistors 240 and 240'. When either the voltage $Av'$ or the voltage $Bi'$ becomes sufficient to overcome the cathode bias on the left or right-hand sections of the triode 228, respectively, the left or right-hand triode sections will commence to conduct, permitting more of the B+ voltage to be developed across the neon or other indicator lamps 230 and 230' and causing them to illuminate. The circuit associated with the double triode 228, therefore, serves as an overload device which, by illumination of either of the indicators 230 and 230', warns the operator that either the voltage circuits or the current circuits are delivering signals outside the range for which the circuits are designed to effect accurate computation. This range is primarily determined by the hereinafter discussed squaring circuits 37 and 39 which can produce a substantially square response only over a predetermined voltage range.

Returning to the cathode followers 33 and 35, Fig. 2A, the four grids 158, 158', 214, 214', thereof, are connected to the moving arms of the respective switches S3, S4, S5 and S6. These switches are ganged together and have three positions labeled Use, Off, and Cal. In the Use position the grids 158, 158', 214, 214' are directly connected to the input voltages on conductors 29, 29', 31 and 31', respectively. When switches are in the Off positions, the four cathode follower grids are all grounded, allowing the operator to check the zero position without actually disconnecting the alternating-current input circuits. Finally, when these switches are in the Cal position, all but one of the cathode follower grids, namely, the grid 158, are grounded. This remaining grid 158 is then connected to a direct-current calibration voltage obtained from resistor network 250. This calibration-voltage input applied to the grid 158 produces a direct-current differential between terminals G and J which corresponds to full scale power input. This allows the operator to adjust the sensitivity control resistance 302, Fig. 2B, to the point which provides full scale deflection on the final recording device in response to the Cal voltage.

Consider now the load circuit of cathode follower 33. As previously noted, the cathodes 208 and 208', Fig. 2A, are directly connected by conductor 53 and terminals G, Figs. 2A and 2B, through resistor 163, Fig. 2B, to a suitable negative potential point 159 in order to establish the proper initial operating bias for the cathode-follower triodes. In addition, the cathodes are directly connected to a number of shunt paths which constitute the actual load and constitute the squaring circuit 37. The first of these paths contains the fixed resistor 246, while each of the others contains both a resistor and a diode in series, such as 127 and $D_8$, and 131 and $D_7$, and so on. All of these shunt paths connect to a common load resistor 248 which completes the load circuit to ground at 85. This resistor 248 is traversed by the load current from all of the shunt paths and the voltage drop across it is therefore a measure of the useful cathode follower load current. Each of the diodes $D_8$, $D_7$, etc. has its cathode maintained at some positive initial bias as determined by a resistance network. For example, cathode 135 of the diode $D_8$ is connected to the junction of resistors 103 and 101 which, in turn, are part of a voltage divider or bleeder network 93, 95, 97, 99, 101, 103, bridged across the B+ voltage supply from the B+ terminal to the ground terminal 107.

Similarly, the cathodes of diodes $D_7$, $D_6$, $D_5$ and $D_4$ are biased at increasingly higher positive potential levels. The cathode 137 of the diode $D_7$, for example, is connected to the junction of voltage-divider resistors 99 and 101 by resistor 133, which is of higher positive voltage value than that of the junction between resistors 101 and 103. The voltage divider resistors across the B+ supply and the resistor pairs such as 127—129 and 131—133 associated with each diode all combine to deliver a certain bleeder current to the load resistor 248 which produces a small initial output voltage across this resistor even when there is no input signal. This initial output voltage is not part of the useful cathode follower output referred to above. This initial output is, in fact, balanced out by an equal voltage drop appearing across resistor 244 on the opposite side of the circuit associated with the squaring circuit 39.

As the output voltage of the cathode follower 33 appearing at terminal G rises, current flows through resistor 246 and into load resistor 248. The output across resistor 248 thus increases linearly with the voltage at G, and at a rate determined by the value of resistor 246. As long as the voltage at G is less than the positive bias at the cathode 135 of diode $D_8$, this diode and all the other diodes $D_7$, $D_6$, $D_5$, and $D_4$ of the squaring circuit 37 will remain non-conducting and load current will flow only through resistor 246. When however, the voltage at the terminal G exceeds the initial bias on cathode 135, the diode $D_8$ becomes conducting, and, in effect, the junction of resistors 127 and 129 becomes directly connected to the terminal G. Load current can now flow into resistor 248 through two paths; namely, through resistors 127 and 246. Again, the voltage across the load resistor 248 will increase linearly with the voltage at the terminal G, but at a greater rate because the resistor 246 is now shunted by the resistor 127. Further increases in the voltage at the terminal G will produce conduction in the successive diodes $D_7$, $D_6$, $D_5$ and $D_4$, so that each, in turn, contributes its share to the total useful load current flowing through resistor 248. The relation between the voltage across resistor 248 and the voltage at terminal G is thus comprised of a series of straight line segments, with each segment having a steeper slope as an additional diode is brought into the circuit. Such a characteristic can be made to approximate the desired square law by appropriate choice of diode load resistors and delay biases. The degree of approximation, in turn, can be made as close as required by the use of a sufficiently large number of diodes.

The diodes themselves are used only as on-off switches in this type of circuit and their own volt-ampere characteristics are caused to have negligible effect upon the operation of the system through the selection of diodes the forward resistance of which is small and the back resistance of which is high compared to their corresponding load resistors 127, 131, etc. In addition, the range of voltage variation at the first stage 6 of the amplifier 13 and the resultant voltage spread of each of the straight line segments of the square-law approximation should be large compared to the voltage range over which the diode characteristic is gradually changing from a condition of non-conduction to a condition of conduction.

While many choices of diode bias and load resistances could be made to yield a square-law characteristic, one combination which has been found particularly satisfactory is to space the biases at equal voltage increments. For instance, the voltage at the junction of resistors 127 and 129 may be set at 10 volts, the junction of resistors 131 and 133 may be set at 20 volts, and so on, in ten-volt increments. For such equal bias increments, it is found that the square law will be approximated if all the diode load resistors 127, 131, etc., are equal to each other and twice as great as the initial resistor 246. It has further been found that with such an equal-segment square-law approximation, a system containing five diodes will be accurate within one percent of the full range covered by the squaring circuit.

The description given above for the squaring circuit 37 connected to terminal G applies equally to the squaring circuit 39 connected to terminal J, with minor exceptions. In the first place, since terminal J is associated with the cathode follower 35, and this circuit handles the $$\frac{(Av'-Bi')}{2}$$

signal rather than the $$\frac{(Av'+Bi')}{2}$$

signal, a smaller voltage swing is covered. This makes it possible to reduce the squaring circuit to a three-diode rather than a five-diode network. The three-diode network 39 is shown comprising diodes $D_1$, $D_2$ and $D_3$ each having respective anodes 77, 79 and 81 connected to conductor 57 and through resistor 161 to the negative terminal 159, and respective cathodes 83, 111 and 115 connected to successively lower bias voltages. The cathode 83 of the diode $D_1$ is connected to the junction of resistors 87 and 89 while the cathodes 111 and 115 of the diodes $D_2$ and $D_3$ are respectively connected to the junctions of respective resistors 113, 119 and 125, 121. Resistors 89, 119 and 121 are, in turn, connected to successively lower bias-voltage points at the junctions of respective bleeder resistors 97—99, 99—101 and 101—103, while resistors 27, 113 and 125 are connected to conductor 117 between the before-mentioned junction 109 and the variable resistor 139 supplying B+ voltage by way of conductor 105 from conductor 52.

The use of three diodes in the squaring circuit 39 instead of five, as in the squaring circuit 37, however, would reduce the no-signal bleeder current through load resistor 244 to a level lower than that found in corresponding resistor 248 associated with the squaring circuit 37. This discrepancy is compensated for by the adjustable resistor 139, which permits the attainment of an initial balance condition.

It is the difference voltage between the junction 109 of resistors 242 and 244, associated with the squaring circuit 39, and the junction 10 of resistors 246 and 248, associated with the squaring circuit 37, that contains the direct-current term representing the average power. This difference voltage is applied to a resistance network containing fixed resistors 123, 301 and 141, and the adjustable resistor 302. The fraction of the total difference voltage remaining across resistor 302 is then connected to the low-pass filters 41, 43 and by conductors 55 and 59. This fraction is controlled by the resistor 302 to provide an overall sensitivity control for the system. The filters 41 and 43 remove the alternating-current components, before discussed, in order to produce in the output of the differential amplifier 61 only the direct-current voltage corresponding to the average power. The cathodes 151 and 153 of the differential amplifier sections 149 and 145 are connected together through resistors 155 and through a common resistor 157 to a source of negative bias potential, illustrated by the symbol $-ve$. This negative terminal is also connected by conductor 159 through respective resistors 161 and 163, to the conductors 53 and 57, before mentioned. The plates 165 and 167 of the differential amplifier sections 149 and 145 are connected through respective resistors 169 and 171 to conductor 173 that, in turn, connects with the B+ supply line 53. Differential output voltages are developed between the output conductors 63 by the connection of the plate 165 through a resistor 177 to the upper output conductor 63, and by a similar connection from the plate 167 through a similar resistor 179 to the lower output conductor 63. The output conductors 63 are connected to a ground terminal 181 through similar further resistors 183 and 185. The difference between the input voltages to the differential amplifier sections $$\frac{(Av'+Bi')^2}{4} - \frac{(Av'-Bi')^2}{4}$$

will be produced, providing in the output conductors 63 a direct-current voltage corresponding to the time integral $$\frac{1}{T}\int_0^T vi\,dt$$

which is the average power applied to the load 5 by the mains conductors 1 and 3.

Several of the features of the present invention may also be utilized to indicate or record on a linear scale or chart the true R.M.S. value of a time-varying voltage, current or other function, through the utilization of a pair of squaring circuits of the type before described, one employed in a feedback arrangement with a high gain direct-current amplifier. To convert the R.M.S. value of, for example, an alternating-current voltage into a proportional direct-current voltage, it is necessary first, to square the alternating-current voltage; secondly, to average the squared value (over several cycles); and then, thirdly, to extract the square root of this average. Referring to Fig. 3, an input transformer 19 may feed a push-pull alternating-current amplifier 23, corresponding to the transformer 19 and amplifier 23 of Figs. 1 and 2, to provide out-of-phase voltages $v$ at the output conductors 25, 25'. Independence from ground is thus achieved as is appropriate input impedance for the current-measuring circuit. These voltages are shown applied to the push-pull cathode-follower 35, corresponding to that of Figs. 1 and 2A, and thence to the squaring circuit 39. The calibration voltage derived from the potentiometer 252 of Fig. 2A is shown in Fig. 3 as derived from a battery 254. An overload indicator lamp or other device 281 is connected from the cathode junction 222 of the cathodes 220, 220' of the cathode follower 35, to ground, in order to avoid erroneous readings due to peaked wave forms which might overload the squaring circuits.

In the output conductor 59 of the squaring circuit 39, a voltage proportional to the square of the input signal has thus been produced and it may be filtered of its alternating-current components by the low-pass filter 43 in the same manner illustrated and described in connection with Fig. 2B. This filter performs the averaging function referred to above. If the output voltage of the filter 43 be represented as $e_1$, then the voltage $e_1$ is applied to the input of differential direct-current amplifier 256, producing in the output 336 thereof a voltage $e_2$. Part of the voltage $e_2$ is fed by conductor 337 to a further similar squaring circuit 334. The output voltage $e_3$ of this further squaring circuit will thus be proportional to $e_2^2$. The voltage $e_3$, however, is fed back to the input of the direct-current amplifier 256 by conductor 339. It then follows that the amplifier output voltage is proportional to the difference $e_1-e_3$, the factor of proportionality being the gain of amplifier. If that gain is very large, the difference $e_1-e_3$ will be very small and $e_1$ will approximately equal $e_3$. Since, as before stated, $e_3$ is proportional to $e_2^2$, $e_1$ will accordingly be substantially proportional to $e_2^2$, or, otherwise stated, $e_2$ will thus be substantially proportional to $\sqrt{e_1}$. Through the use of the squaring circuit 334 in the feed-back loop of the high-gain differential direct-current amplifier 256, therefore, the square root operation has been effected and the output direct-current voltage $e_2$ will measure the R.M.S. value of the input voltage or current.

Thus, by extracting the square root electrically in this manner, an output voltage is obtained which is directly proportional to the R.M.S. value of the input, and the scale of the instrument is linear, a further feature which is lacking in conventional instruments.

A preferred high-gain direct-current amplifier circuit 256 is illustrated in Fig. 4 comprising three pairs of upper and lower direct-current amplifier tubes 258—264, 260—266 and 262—268. The lower amplifier tubes 264, 266, 268 each have respective cathodes 270, 272 and 274; respective control-grid electrodes 276, 278 and 280; and respective plates or anodes 282, 284 and 286. The upper tubes 258, 260 and 262 are similarly provided with respective cathodes 288, 290 and 292; respective control-grid electrodes 294, 296 and 298; and respective plates or anodes 300, 302 and 304. The cathodes 288 and 270 are connected together through a common resistor 306, illustrated in the form of a potentiometer to which a suitable negative bias is applied from a negative voltage bias source labelled $-ve$. The plate supply for the anodes 300 and 282 of the upper and lower tubes 258 and 264 may be supplied from the B+ terminal through plate resistors 308 and 310. The plates 302 and 284 of the second pair of upper and lower tubes 260 and 266 and the plates 304 and 286 of the third pair of upper and lower tubes 262 and 268 are similarly supplied with B+ plate potential through respective plate resistors 312, 314, 316 and 318. The cathodes 290 and 272 of the second pair of tubes 260 and 266 are grounded through a cathode resistor 320. The cathodes 292 and 274 of the third pair of tubes 262 and 268 are similarly connected to ground through a common resistor 322. The amplifier stages 258—264, 260—266, 262—268 are all directly coupled. The plate 300 of the tube 258 is shown directly connected to the grid 296 of the tube 260. The plate 302 of the tube 260 is shown connected through a coupling resistor 324 to the grid 298 of the tube 262. The plate 282 of the tube 264 is similarly directly connected to the grid 278 of the tube 266, while the plate 284 of the tube 266 is connected through a coupling resistor 326 to the grid 280 of the tube 268. The output of the amplifier system 256 may be fed through output coupling resistors 328 and 330 to a direct-current recorder or to any other desired indicator. In the circuit illustrated in Fig. 4, only the output conductor 336 is shown feeding the recorder with respect to ground. Connected between the coupling resistors 328 and 330 is a resistive bleeder network 332 supplied (intermediately) with negative potential, "$-ve$." In Fig. 4, the feedback conductor 337 is shown connected to the bottom tap of the bleeder network 332. The output conductor 339 of the squaring circuit 334 is connected to the control-grid electrode 276 of the lower of the first pair of amplifier tubes 264.

Further modifications will occur to those skilled in the art and all such are considered to fall within the spirit and scope of the invention as defined in the appended claims.

What is claimed is:

1. An electric system having, in combination, means for producing a first alternating-current voltage corresponding to the current in a circuit, means for producing a second alternating-current voltage corresponding to the voltage in the circuit, push-pull amplifying means for producing a first pair of anti-phase voltages corresponding to the first voltage, push-pull amplifying means for producing a second pair of anti-phase voltages corresponding to the second voltage, resistive means for combining the first and second pairs of voltages to produce third and fourth pairs of anti-phase voltages corresponding respectively to the sum and the difference of the voltages of the first and second pairs of voltages, a pair of push-pull cathode-follower means connected to the combining means for receiving the third and fourth pairs of anti-phase voltages, respectively, a pair of voltage-squaring means, one connected to each of the pair of push-pull cathode-follower means, for squaring the third and fourth pairs of anti-phase voltages, means for selecting the direct-current components of each of the squared third and fourth pairs of voltages, and means for obtaining the difference between the said direct-current components, thereby to obtain a direct-current voltage proportional to the time average of the instantaneous products of the first and second voltages.

2. An electric system having, in combination, transformer means for producing a first voltage corresponding to the current in a circuit, voltage-transformer means for producing a second voltage corresponding to the voltage in the circuit, push-pull amplifying means for producing a first pair of anti-phase voltages corresponding to the first voltage, push-pull amplifying means for producing a second pair of anti-phase voltages corresponding to the second voltage, resistive means for combining the first and second pairs of voltages to produce third and fourth pairs of anti-phase voltages corresponding respectively to the sum and the difference of the voltages of the first and second pairs of voltages, a pair of push-pull cathode-follower means connected to the combining means for receiving the third and fourth pairs of anti-phase voltages, respectively, a pair of voltage-squaring means, one connected to each of the pair of push-pull cathode-follower means, for squaring the third and fourth pairs of anti-phase voltages, filter-means for selecting the direct-current components of each of the squared third and fourth pairs of voltages, and differential-amplifier means for obtaining the difference between the said direct-current components, thereby to obtain a direct-current voltage proportional to the time average at the instantaneous products of the first and second voltages.

3. An electric system having, in combination, means for producing a first alternating-current voltage corresponding to the current in a circuit, means for producing a second alternating-current voltage corresponding to the voltage in the circuit, push-pull amplifying means for producing a first pair of anti-phase voltages corresponding to the first voltage, push-pull amplifying means for producing a second pair of anti-phase voltages corresponding to the second voltage, means for combining the first and second pairs of voltages to produce third and fourth pairs of anti-phase voltages corresponding respectively to the sum and the difference of the voltages of the first and second pairs of voltages, cathode follower means comprising a plurality of cathode-follower stages connected to the combining means, means connected to the cathode follower means for squaring each of the third and fourth pairs of voltages, means for selecting the direct-current components of each of the squared third and fourth pairs of voltages, means for obtaining the difference between the said direct-current components, thereby to obtain a direct-current voltage proportional to the average product of the first and second voltages, a pair of overload indicators connected respectively to the first- and second-voltage push-pull amplifying means and adjusted to indicate when the first or second voltage has exceeded a value outside the accuracy range of the squaring means, and means for applying a calibration voltage to at least one of the cathode followers of the cathode follower means while rendering other cathode followers thereof ineffective.

4. An electric system having, in combination, means for producing a first alternating-current voltage, means for producing a second alternating-current voltage, means for combining the first and second voltages to produce third and fourth voltages equal respectively to the sum and the difference of the first and second voltages, a pair of voltage-squaring circuits connected respectively to receive at their inputs the third and fourth voltages, each squaring circuit having a shunt-connected input imped-ance and a plurality of successively disposed circuits shunting the input impedance and each comprising an impedance of value less than the input impedance in series with a voltage-operated switching device provided with means for voltage-biasing its operation, the bias voltages of the voltage-operated switching devices of the successively disposed circuits successively increasing in order that the current flowing in the squaring circuit may vary with the voltage received at the input impedance in accordance with successive substantially linear characteristics between regions of the successively increasing bias voltages, thereby to approximate a square-law variation, means for selecting the direct-current components of each of the squared third and fourth voltages, and means for obtaining the difference between the said direct-current components, thereby to obtain a direct-current voltage proportional to the time average of the instantaneous products of the first and second voltages.

5. An electric system having, in combination, means for producing a first voltage corresponding to the current in a circuit, means for producing a second voltage corresponding to the voltage in the circuit, means for combining the first and second voltages to produce third and fourth voltages equal respectively to the sum and the difference of the first and second voltages, a pair of voltage-squaring circuits connected respectively to receive at their inputs the third and fourth voltages, each squaring circuit having a shunt-connected input impedance and a plurality of successively disposed circuits shunting the input impedance and each comprising an impedance of value less than the input impedance in series with a voltage-operated switching device provided with means for voltage-biasing its operation, the bias voltages of the voltage-operated switching devices of the successively disposed circuits successively increasing in order that the current flowing in the squaring circuit may vary with the voltage received at the input impedance in accordance with successive substantially linear characteristics between regions of the successively increasing bias voltages, thereby to approximate a square-law variation, means for selecting the direct-current components of each of the squared third and fourth voltages, and means for obtaining the difference between the said direct-current components, thereby to obtain a direct-current voltage proportional to the time average of the instantaneous products of the first and second voltages.

6. An electric system having, in combination, means for producing a first voltage corresponding to the current in a circuit, means for producing a second voltage corresponding to the voltage in the circuit, push-pull amplifying means for producing a first pair of anti-phase voltages corresponding to the first voltage, push-pull amplifying means for producing a second pair of anti-phase voltages corresponding to the second voltage, means for combining the first and second pairs of voltages to produce third and fourth pairs of anti-phase voltages equal respectively to the sum and the difference of the first and second pairs of voltages, a pair of voltage-squaring circuits connected respectively to receive at their inputs the third and fourth pairs of voltages, each squaring circuit having a shunt-connected input impedance and a plurality of successively disposed circuits shunting the input impedance and each comprising an impedance of value less than the input impedance in series with a voltage-operated switching device provided with means for voltage-biasing its operation, the bias voltages of the voltage-operated switching devices of the successively disposed circuits successively increasing in order that the current flowing in the squaring circuit may vary with the voltage received at the input impedance in accordance with successive substantially linear characteristics between regions of the successively increasing bias voltages, thereby to approximate a square-law variation, means connected to the squaring circuits for selecting the direct-current components of each of the squared third and fourth pairs of voltages, and means for obtaining the difference between the said direct-current components, thereby to obtain a direct-current voltage proportional to the time average of the instantaneous products of the first and second voltages.

7. An electric system having, in combination, means for producing a first voltage corresponding to the current in a circuit, means for producing a second voltage corresponding to the voltage in the circuit, push-pull amplifying means for producing a first pair of anti-phase voltages corresponding to the first voltage, push-pull amplifying means for producing a second pair of anti-phase voltages corresponding to the second voltage, means for combining the first and second pairs of voltages to produce third and fourth pairs of anti-phase voltages equal respectively to the sum and the difference of the first and second pairs of voltages, cathode follower means connected to the combining means, a pair of voltage-squaring circuits connected to the cathode follower means respectively to receive at their inputs the third and fourth pairs of voltages, each squaring circuit having a shunt-connected input impedance and a plurality of successively disposed circuits shunting the input impedance and each comprising an impedance of value less than the input impedance in series with a voltage-operated switching device provided with means for voltage-biasing its operation, the bias voltages of the voltage-operated switching devices of the successively disposed circuits successively increasing in order that the current flowing in the squaring circuit may vary with the voltage received at the input impedance in accordance with successive substantially linear characteristics between regions of the successively increasing bias voltages, thereby to approximate a square-law variation, means connected to the squaring circuits for selecting the direct-current components of each of the squared third and fourth pairs of voltages, and means for obtaining the difference between the said direct-current components, thereby to obtain a direct-current voltage proportional to the time average of the instantaneous products of the first and second voltages.

8. An electric system having, in combination, means for producing a first voltage corresponding to the current in a circuit, means for producing a second voltage corresponding to the voltage in the circuit, push-pull amplifying means for producing a first pair of anti-phase voltages corresponding to the first voltage, push-pull amplifying means for producing a second pair of anti-phase voltages corresponding to the second voltage, means for combining the first and second pairs of voltages to produce third and fourth pairs of anti-phase voltages equal respectively to the sum and the difference of the first and second pairs of voltages, a pair of push-pull cathode follower means connected to the combining means for receiving the third and fourth pairs of anti-phase voltages, respectively, a pair of voltage-squaring circuits connected to the pair of push-pull cathode follower means respectively to receive at their inputs the third and fourth pairs of voltages, each squaring circuit having a shunt-connected input impedance and a plurality of successively disposed circuits shunting the input impedance and each comprising an impedance of value less than the input impedance in series with a voltage-operated switching device provided with means for voltage-biasing its operation, the bias voltages of the voltage-operated switching devices of the successively disposed circuits successively increasing in order that the current flowing in the squaring circuit may vary with the voltage received at the input impedance in accordance with successive substantially linear characteristics between regions of the successively increasing bias voltages, thereby to approximate a square-law variation, means connected to the squaring circuits for selecting the direct-current components of each of the squared third and fourth pairs of voltages, and means for obtaining the difference between the said direct-current components, thereby to obtain a direct-current voltage proportional to the time average of the instantaneous products of the first and second voltages.

9. An electric system having, in combination, means for producing anti-phase alternating-current voltages, push-pull cathode-follower means having an input and an output, means for connecting the input to receive the anti-phase voltages, a squaring circuit having input terminals, and means for connecting the input terminals to the output of the push-pull cathode-follower means, the squaring circuit being provided with an impedance shunting its input terminals, a plurality of successively disposed circuits shunting the said impedance and each comprising an impedance of value less than the said impedance in series with a voltage-operated switching device, and means for biasing the operation of the voltage-operated switching devices of the successively disposed circuits to successively increasing degrees in order that the current flowing in the squaring circuit may vary with the input voltage thereto in accordance with successive substantially linear characteristics between regions of the successively increasing biases, thereby to approximate a square-law variation, means for selecting direct-current components of the squared voltage produced by the squaring circuit, high-gain differential direct-current amplifying means having one input connected to the selecting means and an output, a further squaring circuit having its input connected to the output of the direct-current amplifying means, and a degenerative feed-back connection between the output of the further squaring circuit and the other input of the direct-current amplifying means.

10. An electric system having, in combination, means for producing anti-phase alternating-current voltages, push-pull cathode-follower means having an input and an output, means for connecting the input to receive the anti-phase voltages, a squaring circuit having input terminals, and means for connecting the input terminals to the output of the push-pull cathode-follower means, the squaring circuit being provided with an impedance shunting its input terminals, a plurality of successively disposed circuits shunting the said impedance and each comprising an impedance of value less than the said impedance in series with a voltage-operated switching device, and means for biasing the operation of the voltage-operated switching devices of the successively disposed circuits to successively increasing degrees in order that the current flowing in the squaring circuit may vary with the input voltage thereto in accordance with successive substantially linear characteristics between regions of the successively increasing biases, thereby to approximate a square-law variation, means for selecting direct-current components of the squared voltage produced by the squaring circuit, high-gain differential direct-current amplifying means having one input connected to the selecting means and an output, a further squaring circuit of the same type as the first-named squaring circuit having its input connected to the output of the direct-current amplifying means, and a degenerative feed-back connection between the output of the further squaring circuit and the other input of the direct-current amplifying means.

11. An electric system having, in combination, means for producing anti-phase alternating-current voltages, cathode-follower means having an input connected to receive the anti-phase voltages and an output, a squaring circuit connected to the output of the cathode-follower means to square the output voltage thereof, means for selecting direct-current components of the squared voltage, high-gain direct-current amplifying means having an input connected to the selecting means and an output, a further squaring circuit having its input connected to the output of the direct-current amplifying means, and a degenerative feed-back connection between the output of the further squaring circuit and the input of the direct-current amplifying means.

12. An electric system having, in combination, means for producing anti-phase alternating-current voltages, push-pull cathode-follower means having an input connected to receive the anti-phase voltages and an output, a squaring circuit connected to the output of the cathode-follower means to square the output voltage thereof, means for selecting direct-current components of the squared voltage, high-gain direct-current amplifying means having an input connected to the selecting means and an output, a further squaring circuit having its input connected to the output of the direct-current amplifying means, and a degenerative feed-back connection between the output of the further squaring circuit and the input of the direct-current amplifying means.

References Cited in the file of this patent
UNITED STATES PATENTS 2,434,155     Haynes _____ Jan. 6, 1948

OTHER REFERENCES

Publication I, "Electrical Measurements" by F. K. Harris, John Wiley, New York, 1952, pages 500 and 501. (Copy in Scientific Library and Div. 69.)